United States Patent [19]
Smith

[11] Patent Number: 5,655,106
[45] Date of Patent: Aug. 5, 1997

[54] PERSONAL COMPUTER WITH RISER CONNECTOR FOR EXPANSION BUS AND ALTERNATE MASTER

[75] Inventor: Bruce Alan Smith, Jupiter, Fla.

[73] Assignee: International Business Machines Corporation, Armonk, N.Y.

[21] Appl. No.: 265,551

[22] Filed: Jun. 23, 1994

Related U.S. Application Data

[63] Continuation of Ser. No. 713,232, Jun. 10, 1991, abandoned

[51] Int. Cl.$^6$ .............. G06F 13/40; G06F 13/42
[52] U.S. Cl. .................. 395/500; 364/239.3; 364/240.1; 364/240.2; 364/240.8; 364/242.3; 364/DIG. 1
[58] Field of Search .................................. 395/325, 500, 395/800

[56] References Cited

U.S. PATENT DOCUMENTS

| | | |
|---|---|---|
| 3,902,162 | 8/1975 | Parkinson et al. . |
| 4,056,843 | 11/1977 | Bishop et al. . |
| 4,287,563 | 9/1981 | Huston, Jr. . |
| 4,291,370 | 9/1981 | Charls . |
| 4,309,754 | 1/1982 | Dinwiddie, Jr. . |
| 4,313,160 | 1/1982 | Kaufman et al. . |
| 4,328,543 | 5/1982 | Brickman et al. . |
| 4,363,094 | 12/1982 | Kaul et al. . |
| 4,443,846 | 4/1984 | Adcock . |
| 4,447,878 | 5/1984 | Kinnie et al. . |
| 4,470,100 | 9/1984 | Rebaudo et al. . |
| 4,495,564 | 1/1985 | Draper et al. . |
| 4,509,113 | 4/1985 | Heath . |
| 4,575,793 | 3/1986 | Morel et al. . |
| 4,590,556 | 5/1986 | Berger et al. . |
| 4,598,336 | 7/1986 | Hehl . |
| 4,631,637 | 12/1986 | Romania et al. . |
| 4,631,666 | 12/1986 | Harris et al. . |
| 4,633,392 | 12/1986 | Vincent et al. . |
| 4,647,123 | 3/1987 | Chin et al. . |
| 4,679,166 | 7/1987 | DiCenzo . |
| 4,680,732 | 7/1987 | DiCenzo . |
| 4,683,550 | 7/1987 | Jindrick et al. . |
| 4,688,168 | 8/1987 | Gudaitis et al. . |
| 4,697,095 | 9/1987 | Fujii . |
| 4,704,599 | 11/1987 | Kimmel et al. . |
| 4,787,029 | 11/1988 | Khan . |
| 4,831,620 | 5/1989 | Conway et al. . |
| 4,885,482 | 12/1989 | Sharp et al. . |
| 4,924,355 | 5/1990 | Mitchell et al. . |
| 4,937,785 | 6/1990 | Deering . |
| 4,971,563 | 11/1990 | Wells, III . |
| 4,979,075 | 12/1990 | Murphy . |
| 4,991,085 | 2/1991 | Dalrymple et al. . |
| 5,025,412 | 6/1991 | Pleria et al. . |
| 5,043,877 | 8/1991 | Berger et al. . |
| 5,083,259 | 1/1992 | Berger et al. . |
| 5,101,478 | 3/1992 | Fu et al. . |
| 5,109,517 | 4/1992 | Houda et al. . |
| 5,129,090 | 7/1992 | Bland et al. . |

(List continued on next page.)

FOREIGN PATENT DOCUMENTS

| | | |
|---|---|---|
| 08801008 | 9/1988 | Belgium . |
| 0392114 | 10/1990 | European Pat. Off. . |
| 0401588 | 12/1990 | European Pat. Off. . |
| 2206452 | 1/1989 | United Kingdom . |

OTHER PUBLICATIONS

CompuStar User's Manual, Aug. 1988.

*Primary Examiner*—Kevin J. Teska
*Assistant Examiner*—Ayni Mohamed
*Attorney, Agent, or Firm*—Bernard D. Bogdon

[57] ABSTRACT

Alternate focal bus mastering and expansion bus capability are provided for a Family I computer system where an alternate bus master and expansion or input/output bus are connectable to the computer system through a readily insertable and removable device card connected directly to the processor and memory of the computer system through a series of one or more pluggable interconnecting cards for matingly engaging a computer system planar board connector.

18 Claims, 6 Drawing Sheets

U.S. PATENT DOCUMENTS 5,162,675  11/1992  Olsen et al. .
5,163,833  11/1992  Olsen et al. .
5,170,481  12/1992  Begun et al. .
5,174,762  12/1992  Hoppal et al. .
5,295,247  3/1994   Chang et al. .
5,301,343  4/1994   Alvarez .
5,325,270  6/1994   Wenger et al. .

PERSONAL COMPUTER WITH RISER CONNECTOR FOR EXPANSION BUS AND ALTERNATE MASTER

This is a continuation of application Ser. No. 07/713,232 filed on Jun. 10, 1991 now abandoned.

FIELD AND BACKGROUND OF DISCLOSURE

This invention relates to personal computers, and more particularly to personal computers in which improved capability is provided for local processor bus interfacing from alternate bus masters connected directly through planar and riser card connectors, thereby expanding utilization of components and software designed specifically for bus masters developed for a different bus architecture, whereby AT™ and compatible architectures, can benefit from programs generated for Micro Channel™ architecture.

Personal computer systems in general, and International Business Machines Corporation (IBM) personal computers in particular, have attained widespread use for providing computer power to many segments of today's society. Personal computer systems can usually be defined as desk tops, floor standing, or portable microcomputers that are generally comprised of a system unit having a single system processor and associated volatile and non-volatile memory, a display monitor, a keyboard, one or more diskette drives, a fixed disk storage, and an optional printer. One of the distinguishing characteristics of these systems is a motherboard or system planar to facilitate the connection of these components together. These systems are designed primarily to give independent computing power to a single user and are relatively inexpensively priced and adapted for use and purchase by individuals or small businesses. Examples of such personal computer systems are IBM's PERSONAL COMPUTER AT™ and IBM's PERSONAL SYSTEM/2™ Models 25, 30, L40SX, 50, 55, 65, 70, 80, 90 and 95. These before mentioned marks, and all those which are similarly marked by ™ in this specification, are trademarks of IBM.

These computer systems can be classified into two general families. The first family, usually referred to as Family I Models, use a bus architecture exemplified by the IBM PERSONAL COMPUTER AT and other industry identified "IBM compatible" machines. The second family, referred to as Family II Models, use IBM's MICRO CHANNEL™ bus architecture exemplified by IBM'S PERSONAL SYSTEM/2 Models 50 through 95 computer systems and industry generated clones.

Early introductions of the Family I models typically used the popular INTEL 8088 or 8086 microprocessor as the system processor. These processors have the ability to address one megabyte of memory. Later Family I models and the Family II models typically use the higher speed INTEL 80286, 80386, and 80486 microprocessors which can operate in a real mode to emulate the slower speed INTEL microprocessors such as the 8086 or a protected mode which extends the addressing range from 1 megabyte to 4 gigabytes for some models. In essence, the real mode feature of Intel's 80286, 80386, and 80486 processors provide hardware compatibility with software written for the 8086 and 8088 microprocessors.

As personal computer technology has developed and moved from eight to sixteen and eventually thirty two bit wide bus interaction and to higher speed microprocessors capable of real and protected mode operation, performance capability has been sought by separating the architecture of the personal computer into varying bus areas. More specifically, in the early IBM PC computer system, what came to be known as the expansion bus was essentially a direct extension of the microprocessor 8086 or 8088 connections, buffered and demultiplexed as required. Later, as the AT bus specification was developed and came into wide use (also known as the Industry Standard Architecture or ISA), it became possible to sever the nearly direct connection between the microprocessor and the bus, giving rise to the presence of what became known as the local processor bus and the renaming of the expansion bus as the input/output bus.

Typically, in order to enhance performance, the local processor bus runs at a higher clock speed (typically expressed in Hertz) than does the input/output bus. The IBM AT architecture also opened the possibility of running more than one microprocessor on the input/output bus, through use of direct memory access (DMA) interrupts.

As enhanced performance capability continues to be a goal, and as faster clock speeds have become attainable for microprocessors, strategies have evolved in which it is desirable to accommodate Family II capabilities into Family I systems. In order to do this bus master control is necessary. To date this has been accomplished through planar redesign and usually unwieldy, awkward and expensive re-working of the circuitry. Channel attachment is not preferred, in particular in AT bus systems, since bus mastering on the AT bus is difficult to implement and multiple bus masters may be near to impossible to incorporate, while still maintaining compatibility. Connector re-work also can consume large areas of board space.

The texts *The Micro Channel™ Architecture Handbook* by C. Heath and W. L. Rosch and *The Winn Rosch Hardware Bible* by W. L. Rosch, both published by Brady, cover and explain bus architectures and other components and systems, e.g., alternate bus masters, as contemplated by this invention.

SUMMARY OF THE INVENTION

With the foregoing in mind, this invention provides for the use of Family I computer system architecture when implementing Family II features and capabilities. This is manifested by a system configured with direct connect planar receptors for receiving both the local processor bus and the I/O bus.

DETAILED DESCRIPTION OF INVENTION

While the present invention will be described more fully hereinafter with reference to the accompanying drawings, in which a preferred embodiment of the present invention is shown, it is to be understood at the outset of the description which follows, that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention as defined in the claims.

Figure 1:
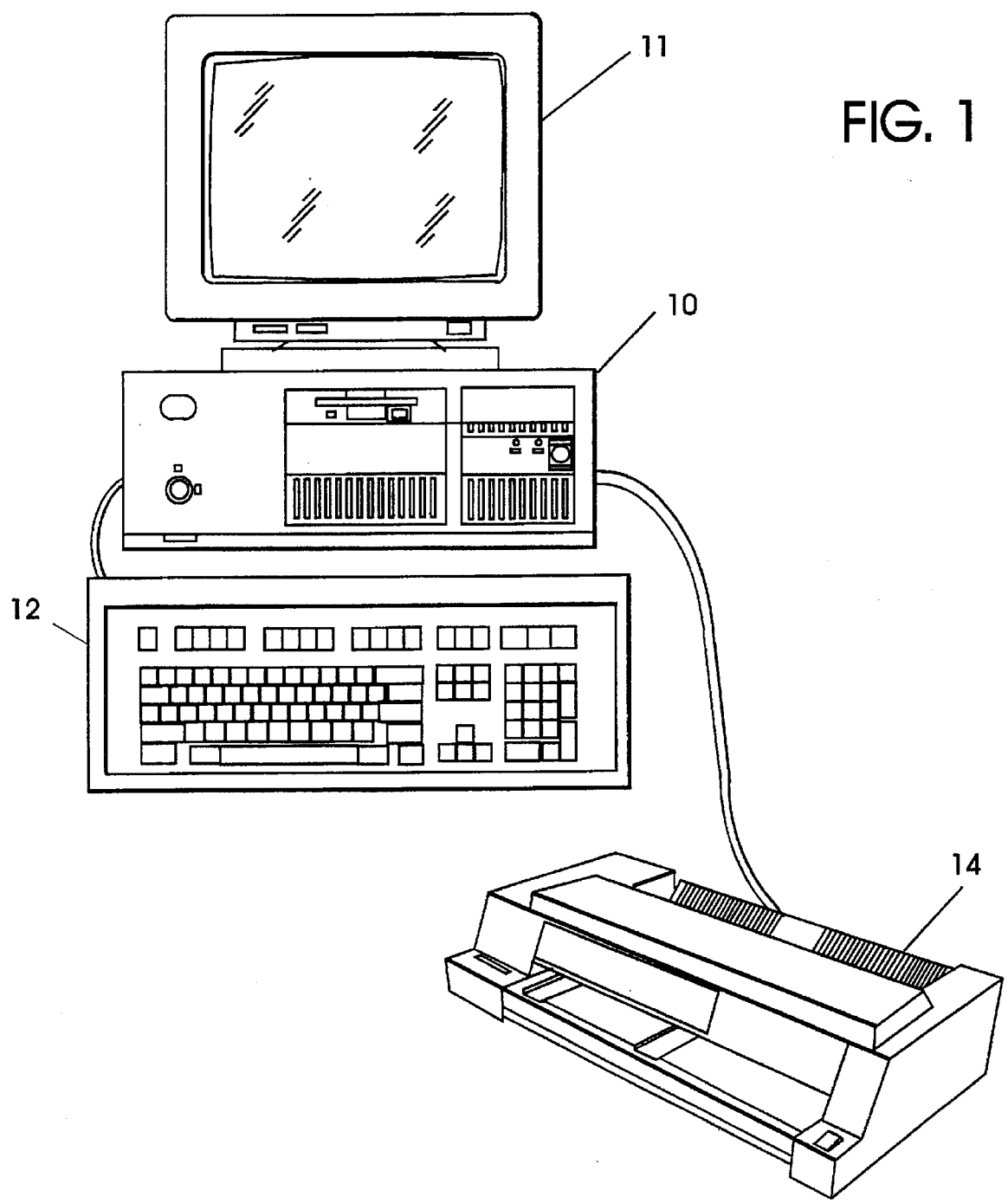
FIG. 1 is a perspective view of a personal computer system embodying this invention.
Figure 2:
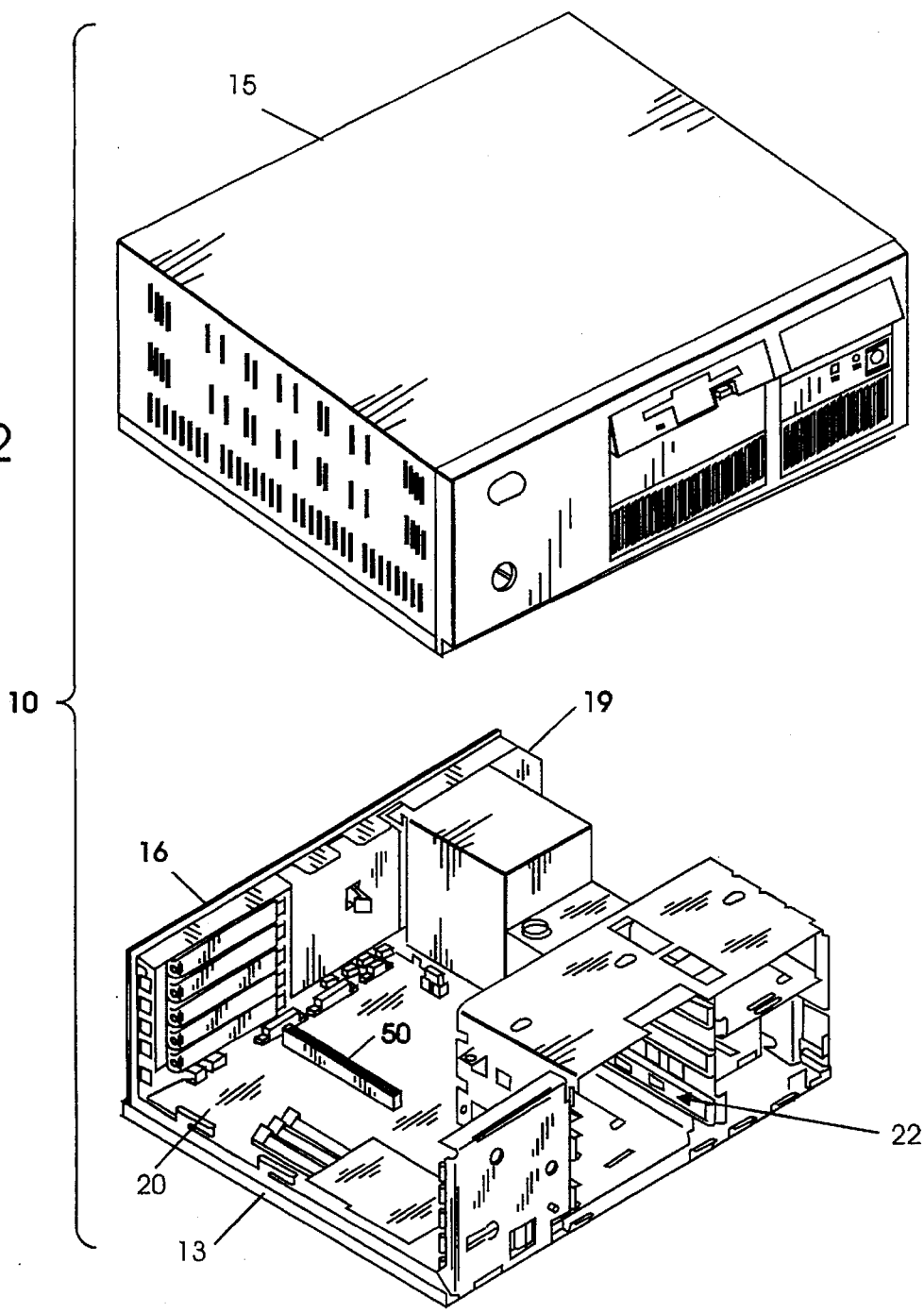
FIG. 2 is an exploded perspective view of certain elements of the personal computer system of FIG. 1, including a chassis, a cover, a planar board, riser board interface connector and back panel illustrating the cooperative relationship among those elements.

Referring more particularly to the accompanying drawings, a microcomputer incorporating the present invention is shown and generally indicated at 10 in FIG. 1. As mentioned hereinabove, the computer 10 may have an associated monitor 11, keyboard 12 and printer or plotter 14. As shown in FIG. 2, the computer 10 has a cover 15 which cooperates with a chassis 19 in defining an enclosed, shielded volume for receiving electrically powered data processing and storage components for processing and storing digital data. At least certain of these components are mounted on a multilayer planar or motherboard 20 which is mounted on the chassis 19 and provides a base for electrically interconnecting the components of the computer 10, including those identified above, and such other associated elements as floppy disk drives, various forms of direct access storage devices, accessory cards or boards, and the like.

The chassis 19 has a base 13 and a rear panel 16 as illustrated in FIG. 2 and defines at least one open bay 22 for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, which is a removable media direct access storage device capable of receiving a diskette inserted thereinto and using the diskette to receive, store and deliver data, as is generally known, may be provided in the upper bay 22.

Figure 5:
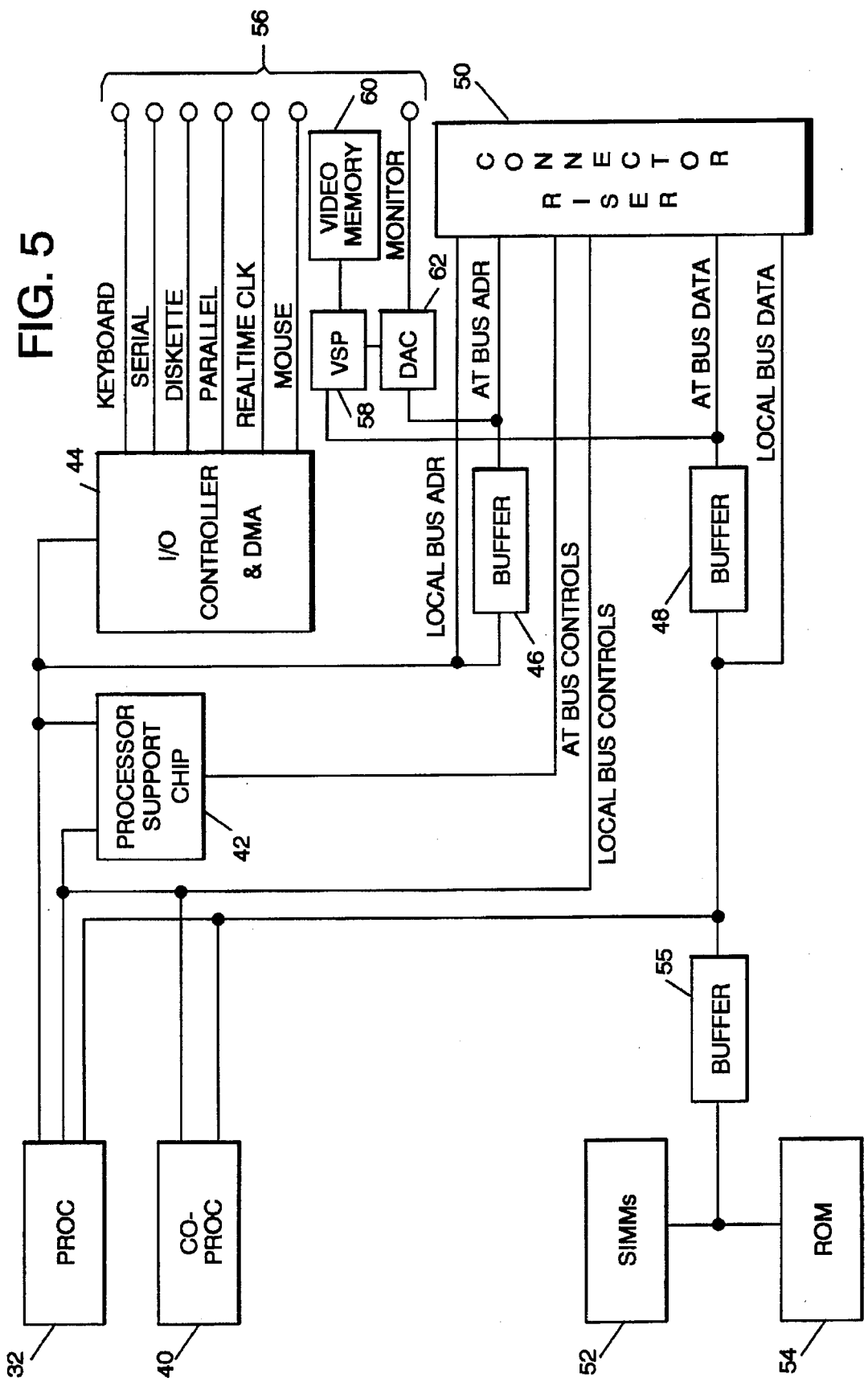
FIG. 5 is a schematic view of certain components of the personal computer system of FIGS. 1, 2, 3 and 4.

Prior to relating the above structure to the present invention, a summary of the operation in general of the personal computer system 10 may merit review. Referring to FIG. 5, there is shown a block diagram of a personal computer system of the Family I variety illustrating the various components of the computer system such as the system 10 of FIG. 2 in accordance with the present invention, including components mounted on the planar 20 and the connection of the planar to the I/O slots and other hardware of the personal computer system. Connected directly to the planar 20 is the system central processing unit 32 (CPU). While any appropriate microprocessor can be used as the CPU 32, one suitable microprocessor is the Intel 80386. The CPU 32 is connected to a high speed CPU local bus comprising the address bus 34, the control bus 36, and the data bus 38. As shown in FIG. 5, CPU 32 is directly connected to the local bus comprising address bus 34, control bus 36 and data bus 38.

In addition to the processor 32, a co-processor 40, processor support chip 42 and I/O controller and DMA 44 are all connected along the local bus which is comprised of the address, control and data buses 34, 36 and 38, respectively. In operation the local bus provides signals, to the separate buffers 46 and 48, which control the address and data buses' data flow, respectively. The combination of the outputs of those buffers 46 and 48, and the output of the processor support chip 42, which provides the AT bus controls, generate the entire AT bus for address, data and controls, frequently referred to as the I/O bus or in the alternative the expansion bus. As such, the AT bus signals interface with the CPU 32 according to a first protocol, e.g., AT, through the processor support chip 42.

The processor support chip 42 actually has numerous connections throughout the logic, which are not shown in FIG. 5, but it functions like the control center for the planar. It provides the signals that control all the buffers, the memory buffers and the AT bus buffers. Any cycle that is generated by the processor 32 is looked at first by the processor support chip 42 and it determines whether that cycle is for one of the local devices, such as the I/O controller, the memory or perhaps the co-processor, or whether it should be passed on to the AT bus for operation. So in addition to generating the AT bus controls, it coordinates the interfacing with the co-processor 40 and the memory, the I/O and DMA controller 44 as well as the AT bus buffers 46 and 48. The AT bus buffers, as contemplated by this invention, are logical buffers for performing re-drive or latching functions.

The I/O and DMA controller 44 of FIG. 5 is a single device used in conjunction with the planar 20. It is attached to the local address bus 34, and to a narrow data bus, not shown in FIG. 5. This I/O controller 44 takes control during DMA cycles and places the target address on the local bus and is then re-driven via the address buffer 46 out of the AT bus. In addition, the I/O controller 44 provides the interface for a number of individual LSI chips, including an 8042 keyboard to mouse controller, 16450 serial port controller, the 82077 diskette controller and a real time clock at terminals 56. The I/O controller 44 also directly provides the parallel port outputs. The chip provides the address decodes on the bus for the various LSI chips eliminating the need for the address decodes on the front end. Also contemplated within the planar 20, or the riser card 23 in the alternative, is an arbiter (not shown) for selecting and prioritizing control of the local bus. As an example, the processor support chip 42 could provide such a function.

Figure 3:
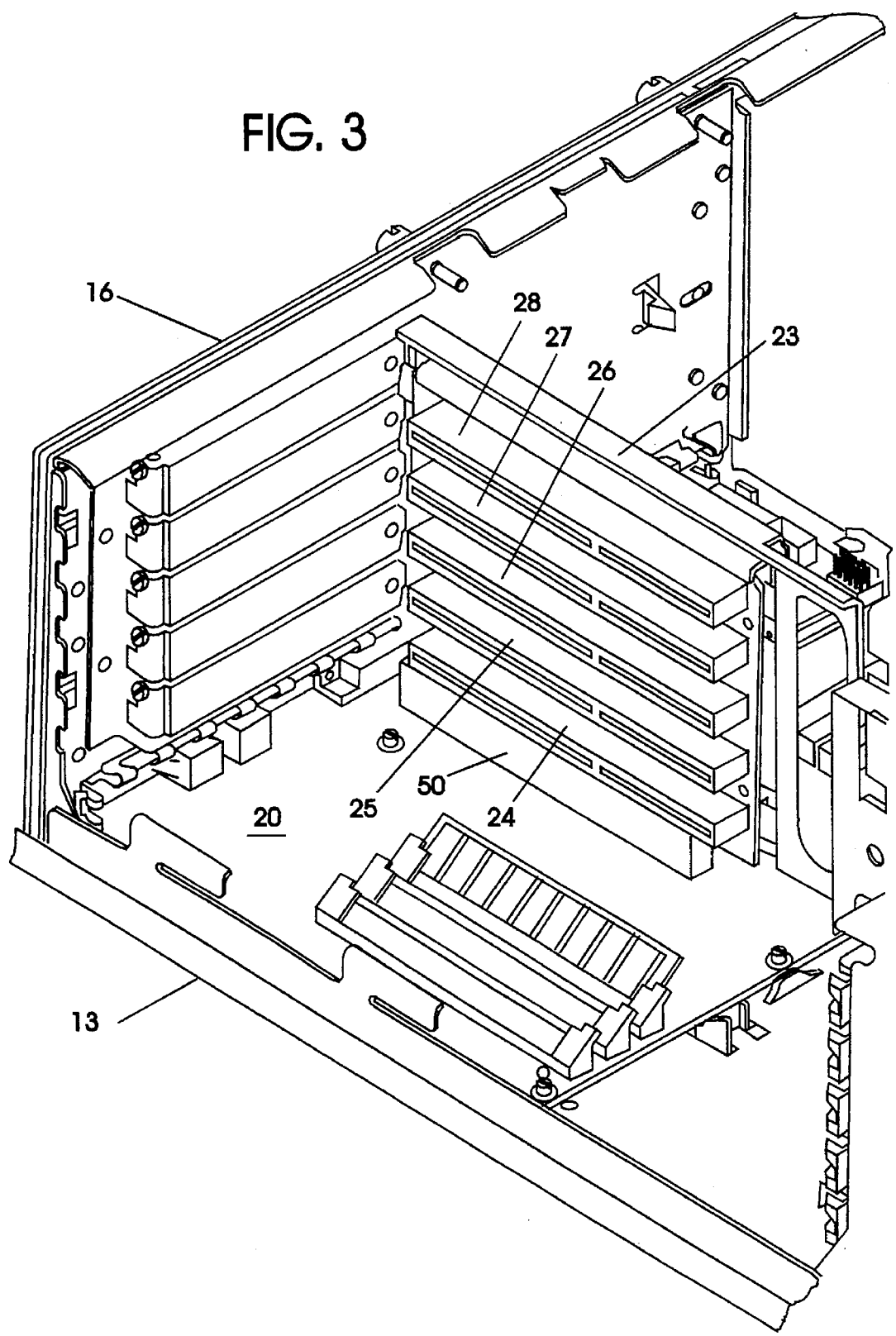
FIG. 3 is a perspective view of the planar, riser board, back panel and partial chassis, illustrating the cooperative relationship between the elements.
Figure 4:
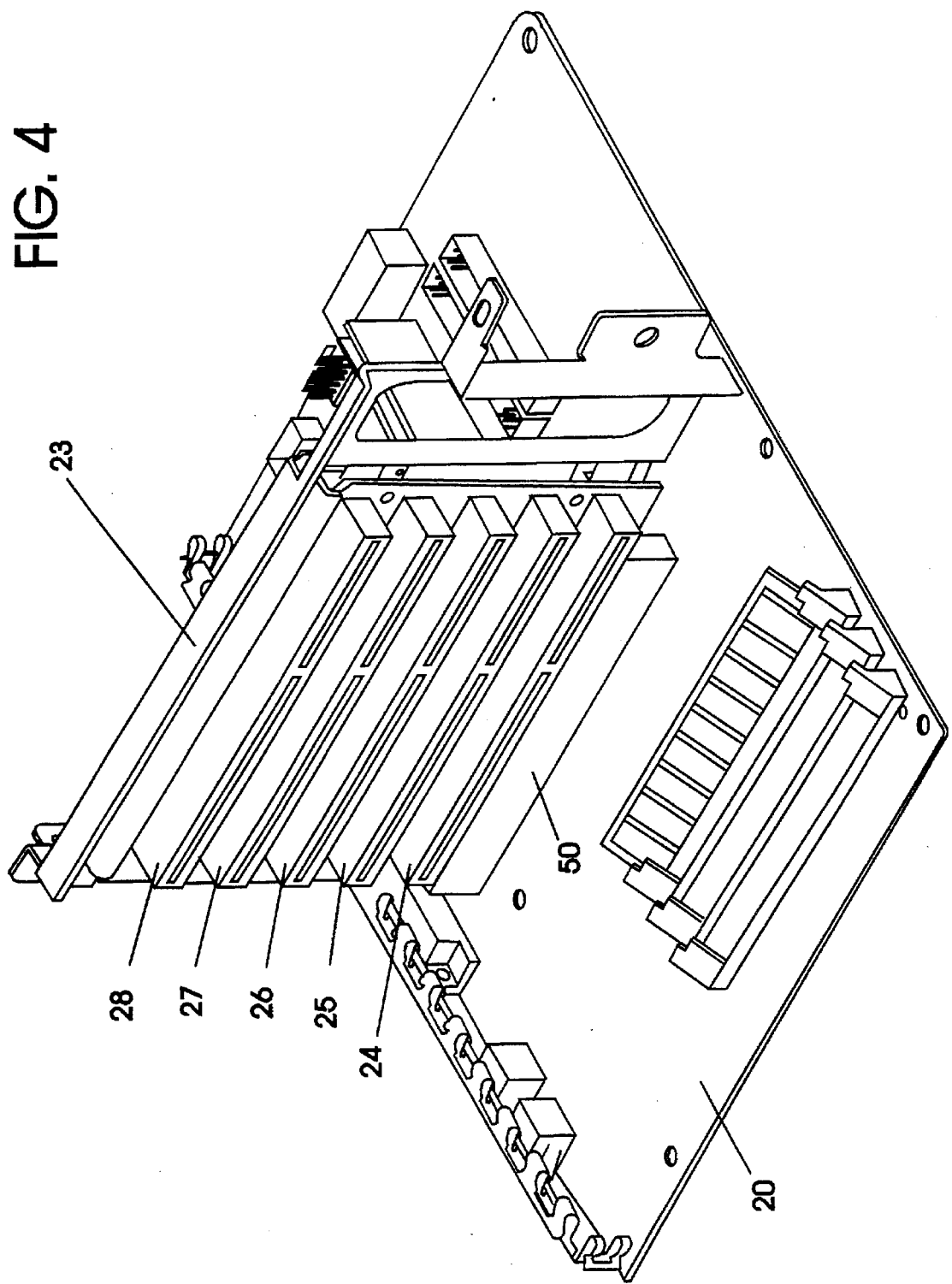
FIG. 4 is a perspective view of the planar board and riser card in cooperative relationship with each other.

In this described embodiment, the AT bus signals run to the riser card 23 which has five connector card slots 24, 25, 26, 27 and 28, as best seen in FIGS. 3 and 4. The local address bus 34, the local bus control 36 and the local data bus 38 are connected directly to the riser connector 50 as well. The connector 50 receives the plug-in riser card 23 which further receives in one of the five riser card slots the plug-in device that communicates specifically to the local bus of the AT system as an alternate or a bus master. The riser card 23 can thereby provide for Family II level functions, in addition to Family I operations. Furthermore, as discussed, connector 50 provides for communicating with the CPU 32 under a first protocol (e.g., Family I, AT bus) as well as communicating with the CPU 32 under a second protocol (e.g., Family II, Micro Channel bus or SCSI) through the local bus signals which are directly coupled to the CPU 32.

In FIG. 5 the CPU 32 is further connected to volatile random access memory, here shown as single in line memory modules SIMMs 52, and to BIOS ROM 54 through buffer 55. The ROM 54 stores instructions for basic input/output operations to the CPU 32. The BIOS ROM 54 includes the BIOS to interface between the I/O devices, such as the keyboard, serial, diskette, parallel, real time clock and the mouse connected at terminals 56, and the operating system of the microprocessor 32 in conjunction with I/O controller and DMA 44. Instructions stored in ROM 59 can be copied into the RAM of SIMM's 52 to decrease the execution time of BIOS.

Further coupled to the local buffered address and data buses can be a variety of I/O components such as a video signal processor (VSP) 58 which is associated with graphic video memory 60 for storing character based information and for storing graphic or image based information. Video signals exchanged with the video processor 58 may be passed through a digital to analog converter (DAC) 62 to a monitor or other display device at terminals 56.

While the present invention is described hereinafter with particular reference to the system block diagrams of FIGS. 5 and 6, it is to be understood at the outset of the description which follows that it is contemplated that the apparatus and methods in accordance with the present invention may be used with other hardware configurations of the planar board. For example, the system processor 32 could be an Intel 80486 microprocessor.

Figure 6:
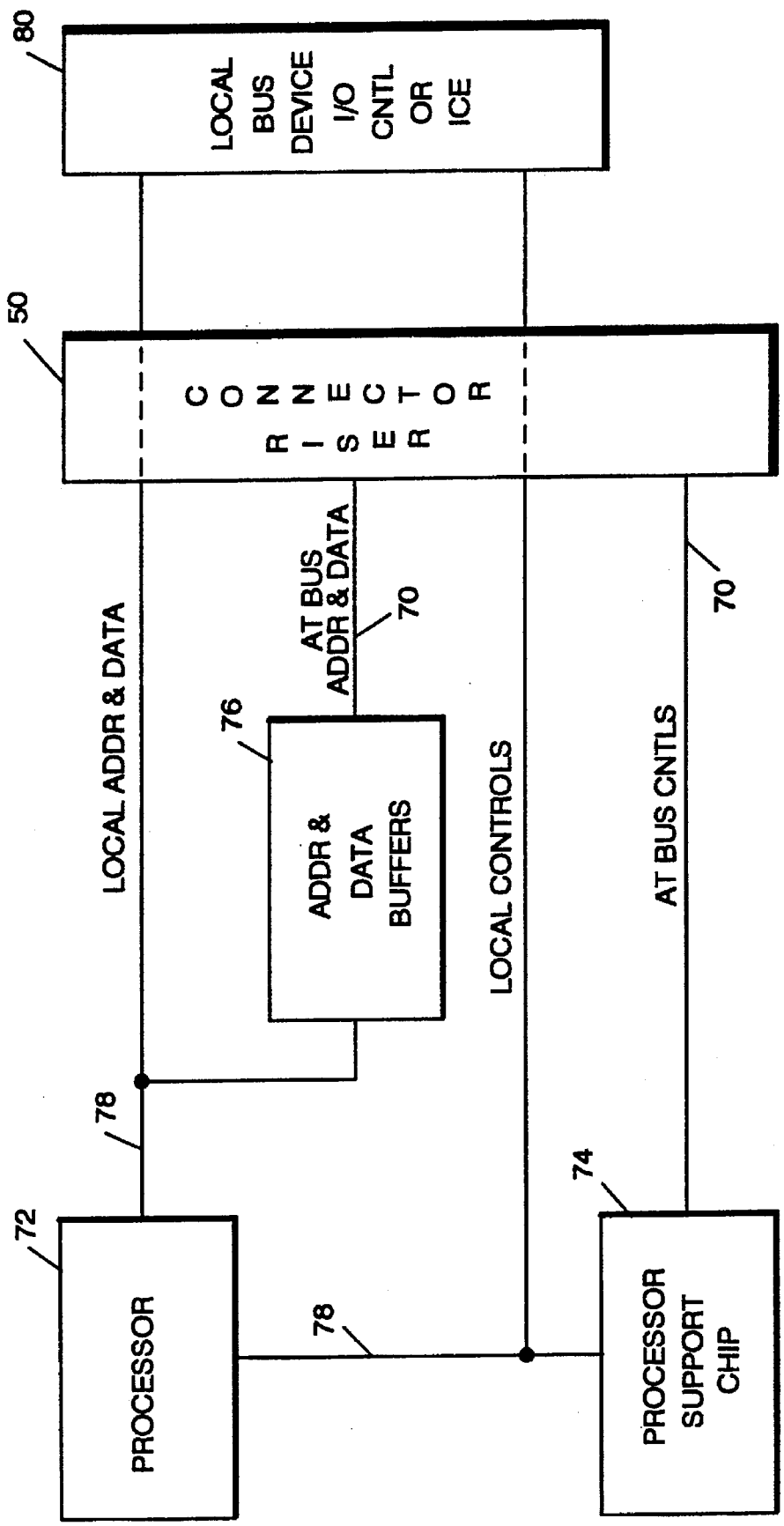
FIG. 6 is an implementation block diagram for schematically illustrating an alternate bus master capability for controlling the local processor.

Before turning in greater detail to the implementation block diagram of FIG. 6, it is appropriate to first consider the support by a personal computer of what have been known as multiple masters or bus masters. As contemplated herein, a "master" is a processor or any circuit designed to gain control over a bus, and drive address, data and control signals on the bus. Having such capability enables a master device to transfer information between system memory and other devices.

Masters which can be alternates to each other can generally be divided among three types—system master (usually the CPU), DMA controller, and bus master. The system master controls and manages the system configuration. It is usually the default master in the system. The default master owns the bus when no other master requires it. A DMA master is a special type of master which transfers data between DMA slaves and memory slaves, and does not arbitrate for the bus, but services the DMA slave that is the arbitrator. As here used, a bus master arbitrates for use of the bus and supports information transfers with an I/O slave or memory slave.

What makes a device a bus master can often be misunderstood, since bus masters do not necessarily require a processor. Also, a bus master may be called on to respond as a slave when accessed by another bus master. A bus master is distinguished by the capability of gaining control of the bus through arbitration and controlling the execution of a defined bus cycle.

Generally, there are three types of bus masters: full function, special function controllers, and programmable special function controllers. The fundamental differences among them are degrees of flexibility, function and cost. The full function bus master is the most flexible, has the most function, and is generally the most expensive. Typically, a full function bus master will have its own programmable CPU and be capable of controlling all system resources, including operating system software. Special function controllers have the least flexibility, function and cost. Typically, a special function controller will use logic circuits but no CPU to perform a specific function while requiring little or no assistance from other masters. Programmable special function controllers span the range between the other two. The fundamental difference between special function and programmable special function controllers is the ability to modify the function and/or execution characteristics of the bus master. Such modification can be accomplished through use of processing units or through settable registers.

With the introduction of Micro Channel architecture in IBM's PS/2 product line, true bus mastering capabilities were implemented. The hardware-mediated arbitration process, the method of pre-emption, and a fairness algorithm for equitable sharing of the bus are primary differences between Micro Channel and AT master capability. Bus mastering under AT architecture necessitated solving the problems of bus control and loss of data from the loss of memory refresh cycles, which are not simple tasks.

The text *Micro Channel Architecture: Revolution in Personal Computing* by Dr. Pat A. Bowlds and published by Van Nostrand Reinhold extensively addresses the issue of masters, devices and arbitration as contemplated by this invention.

The implementation block diagram of FIG. 6 is another level, in terms of a block diagram, above FIG. 5. It shows an AT bus 70 via the output of the processor support chip 74 and the address and data buffers 76, in addition to the local address, data and controls bus 78. The particular illustrated local bus device is an I/O controller or an in-circuit emulator (ICE) 80, which attaches through the riser connector 50 to the local address, data and controls bus 78. It is directly attached to the processor interface bus, and in the case of an ICE 80, the microprocessor 72 on the planar is then disabled, and the entire planar (e.g., planar 20) is run through the riser connector 50 with the in-circuit emulator.

In the case of the local bus device 80, e.g., an I/O controller, whether it is a SCSI controller or a network, as an example, it allows for that particular device to take over control of the processor local bus 78 for brief periods of time. The signals that are placed on the local address, data and controls bus 78 will be regarded as a standard processor output from processor 72 and treated as such by the support chip 74 and the address and data buffers 76. This provides for addressing memory on an AT attached device, through the local bus 78 via a mechanism other than the base processor 72 that is on the planar 20. In this manner the riser card interface 50 has both the AT bus signals and the processor bus signals. In the first instance, the connected riser card contemplates only use of the AT bus signals, but is capable of receiving alternate masters for attachment to the processor bus without redesign of the planar. If not earlier anticipated, a modified riser card may be necessary.

If it is desirable to incorporate an ICE, then the likely implementation would be a unique card plugged to a modified riser card 23, plugged to the riser connector 50 and translated physically from the riser connector 50 to the in-circuit emulator footprint. In the case of a local I/O device, the likely implementation would also be a modified riser card that would have, for example, four AT bus connectors and one unique connector for receiving the local bus device. As an example, one can initiate a design with a local SCSI device as a separate board, that plugs into the unique riser card. Without this inventive contribution a standard I/O controller, like a SCSI device, would require two code versions, one each for handling the Family II bus design and the Family I design, respectively which unnecessarily increases operating system path lengths. Therefore, the present invention offers the advantage of having a single riser card supporting two bus architecture codes or protocols through the local bus.

There are some essential differences in the code architecture between the Family I and Family II implementations. In a Family I design, the operating system and BIOS together have to identify the data to be transferred, and program the DMA controller, in addition to the SCSI controller, assuming that is the device in use. They operate upon the hardware in both cases and get them set up and synchronized to prepare them to do a transfer. In the case of a Family II design with system control block architecture, the operating system and BIOS collect the data areas to be transferred and generate some command sequences and write a control block, or a series of control blocks that are linked together, into memory. It then informs the bus master that the task list starts in a certain point of memory, and the bus master will then not only move data back and forth, but also actually pull the commands out of main memory. These commands can then be chained together so that the operating system will minimize the number of times it goes through a similar code path. It also reduces the number of interrupts that occur between the I/O controller and the system. Interrupt code path lengths in operating systems are generally very long paths that degrade the overall system performance, particularly if the interrupts come in too frequently.

Even though the Family I bus architecture does allow for masters to take over control of the local bus, there are some performance limitations, since the minimum cycle time is about 375 nanoseconds. A local bus device via the riser card connector, will access memory in 100–200 nanoseconds, depending on the cycle type. This allows data to move from an I/O controller implementation on the riser card, from the I/O controller in the main memory and back and forth. It is really an absolute requirement for an in-circuit emulator to be attached and take over control of the system because the in-circuit emulator needs to run at full speed, which is the capability that is possible by attachment to the local bus, as opposed as through the master capability of the Family I bus.

Since the AT bus is not adapted to multiple architected master capability, there is some limited mastering. It is not of the sophistication of the Micro Channel architecture, for example, that has system control blocks. The type of device that is most likely desirable is one that is fully supported with existing software that recognizes the particular device. This provides for a straight forward migration onto a Family I platform without having to do a unique hardware re-design.

A logical model of the connector includes provision for both the local bus and the AT bus. Connector 50 receives signals such as the local MIO and A, for example, which signals are all local bus signals. There is a defined set of signals that are attributable to the AT bus essentially in the central portion of an exemplary connector. The local address bus typically being connected on one end of the connector, and the local data bus typically being connected on the other end of the connector. Also there are various control signals on both ends of the connector. The location of the connections are dependent on accessibility to the connector body in the circuit layout. Therefore, the particular implementation, as far as where the signals fall on the connector interface, is guided by the planar design.

Providing this inventive capability can be accomplished through the relatively inexpensive addition of 50 or 60 signals added to the riser connector 50 and simple multiplexing circuits, including a couple of tri-state drivers and a pull-up resistor added to the planar 20.

Other side benefits of the routing of the processor bus to the riser card interface, are easy access to the AT or I/O bus and processor bus for test and debugging. Further, processor emulation can be implemented through the interface rather than through unique connection schemes now necessary for state of the art computer systems.

In the drawings and specification there has been set forth a preferred embodiment of the invention and, although specific terms are used, the description thus given uses terminology in a generic and descriptive sense only and not for purposes of limitation.

What is claimed is:

1. A data processing system including alternate local bus mastering through a planar interface, comprising:

a computer having computer elements including a processor for generating processor signals, memory, a local processor bus, buffer means receiving the processor signals from the processor along the local processor bus for generating output signals as a function of the received processor signals from the processor, an input/output bus receiving the output signals and a planar board having connections for the computer elements, including connections for the local processor bus and the input/output bus; and a receptor connector on the planar board in direct communication with the local processor bus and the input/output bus receiving two or more input/output devices operative under code architecture which is different in each of the two or more input/output devices and different than the code architecture of the local processor bus where any one of the two or more input/output devices is directly connected to either the local processor bus or the input/output bus to comprise the planar interface to directly connect the any one of the two or more input/output devices to the local processor bus for disabling the processor and to thereby provide alternate local bus mastering over the local processor bus by the any one of the two or more input/output devices.

2. The system, as defined in claim 1, wherein the any one of the two or more input/output devices directly connected to the local processor bus is an in-circuit emulator, having an emulator processor which disables the processor of the computer and controls the entire planar board through the receptor connector in direct communication with the local processor bus.

3. A data processing system having alternate mastering of a processor bus, comprising:

a local processor for generating processor signals of a first code architecture including address, data and control signals;

a processor bus for carrying the address, data and control signals;

memory connected to the processor bus controllable by the local processor;

a planar board for supporting the local processor and processor bus;

buffer means connected to the processor bus receiving the address and data signals for generating buffer output signals of a second code architecture different than the first code architecture;

a processor support device connected to the processor bus receiving the control signals for generating processor support output signals of the second code architecture;

an input/output bus receiving the buffer output signals from the buffer means and the processor support output signals from the processor support device;

a planar connector supported by the planar board connected to the processor bus and the input/output bus;

a riser card connected to the planar connector receiving processor signals direct from the processor through the planar connector and receiving the processor support output signals;

a first slot connector on the riser card for connecting to a first input/output device in direct communication with the processor signals, wherein the first input/output device is a local bus master alternate device to the local processor of the data processing system which disables the local processor and is a bus master over the processor bus and;

a second slot connector on the riser card for connecting to a second input/output device in direct communication with the buffer output signals and the processor support output signals.

4. A data processing system as defined in claim 3, wherein the first input/output device is an in-circuit emulator having an emulator processor, for receiving the processor signals through the planar connector and having direct communication with the processor signals and functioning as a local bus master alternate to the local processor to control the operation of the local processor and the memory supported by the planar board of the data processing system.

5. The data processing system, as defined in claim 4, wherein test and debug apparatus is directly connected to the planar connector to be in direct communication with the planar board to determine the operational effectiveness of the data processing system.

6. The data processing system, as defined in claim 4, wherein test and debug apparatus is connected to the riser card for direct communication with the data processing system including the processor bus and the input/output bus through the riser card connected to the planar connector.

7. The data processing system as defined in claim 3, wherein an emulator processor is connected through the planar connector for direct communication to the data processing system.

8. A computer system, comprising:
a motherboard;
a local bus on the motherboard;
a CPU having ports for providing CPU local bus signals having a first protocol;
a memory section on the motherboard;
a processor support chip coupled to the CPU having ports for providing control, data and address signals of an I/O expansion bus having a second protocol;
an I/O expansion bus connector coupled to the control, data and address signals of the I/O expansion bus and connected to an I/O expansion device;
a local bus connector on the motherboard coupled to directly receive the CPU local bus signals;
a riser card;
a first riser card connector for coupling the riser card directly to the local bus connector;
alternate bus conversion means for converting the CPU local bus signals received through the riser connector to bus signals having a third protocol of an alternate expansion bus on the riser card; and
an alternate expansion bus connector for receiving an alternate expansion device.

9. The computer system of claim 8, wherein said riser card includes,
a second riser card connector connected directly to the I/O expansion bus connector; and
an I/O expansion device connector on the riser card for receiving the I/O expansion device.

10. The computer system of claim 8, further including a next expansion device coupled to the alternate expansion device connector, the next expansion device, receiving the bus signals of the alternate expansion bus which has signals of the alternate expansion bus include identification signals for identifying the alternate expansion device, and wherein the CPU determines the identity of the alternate expansion device through the CPU local bus.

11. The computer system of claim 8, further including an expansion master device coupled to the alternate expansion device connector, the expansion master device adapted to take control of the CPU local bus for a period of time, and wherein the bus signals of the alternate expansion bus are of the same protocol as the protocol of the expansion master device.

12. The computer system of claim 8, wherein the riser card includes an arbitration circuit for arbitrating access control over the local bus.

13. The computer system of claim 12, wherein the processor support chip is positioned on the riser card.

14. A data processing system comprising:
a microprocessor subsystem providing a central processing unit (CPU) code architecture including,
a CPU having CPU address signal lines, CPU data signal lines and CPU control signal lines which address, data and control signal lines form a CPU code architecture set of processor direct signal lines wherein a subset of the set of processor direct signal lines includes CPU address signal lines, CPU data signal lines and CPU control signal lines necessary for implementation of one of a plurality of specific bus code architectures as alternate bus code architectures, which are bus code architectures alternate to the CPU code architecture and which include a first expansion bus code architecture;
a memory module coupled to the CPU; and
a microprocessor subsystem multi-line connector which is in direct electrical communication with the CPU set of processor direct signal lines; and
an alternate code architecture subsystem providing the alternate bus code architectures and adapted for electrical connection to the microprocessor subsystem through the multi-line connector including,
a riser card having an edge connector along only one edge of the riser card for mating with the microprocessor subsystem multi-line connector which edge connector mates with the microprocessor subsystem multi-line connector for communicating with the microprocessor subsystem through the CPU code architecture set of processor direct signal lines; and
a first expansion bus device connected to the riser card which first expansion bus device communicates with the CPU and the memory module through the edge connector of the riser card according to the first expansion bus code architecture which first expansion bus code architecture is one of the plurality of specific bus code architectures which are the bus code architectures alternate to the CPU code architecture.

15. A method of changing the bus code architecture on a computer comprising:
providing a connection to a central processing unit (CPU) local bus code architecture set of processor direct signal lines wherein the connection is made to the CPU local bus code architecture set of processor direct signal lines including CPU address signal lines, CPU data signal lines and CPU control signal lines such that a connected subset of the local bus code architecture set of processor direct signal lines includes CPU address signal lines, CPU data signal lines and CPU control signal lines necessary for implementation of one of a plurality of specific bus code architectures, including a first expansion bus code architecture;
selecting a first subset of the local bus code architecture set of processor direct signal lines necessary for implementation of the first expansion bus code architecture; and connecting the first subset of the local bus code architecture set of processor direct signal lines necessary for implementation of the first expansion bus code architecture to receptor means carrying a device which functions in accordance with the first expansion bus code architecture and communicating the first subset of the local bus code architecture set of processor direct signal lines with the device.

16. A method of changing the bus code architecture on a computer comprising:

providing a connection to a central processing unit (CPU) local bus code architecture set of processor direct signal lines wherein the connection is made to the CPU local bus code architecture set of processor direct signal lines including CPU address signal lines, CPU data signal lines and CPU control signal lines such that a connected first subset and a connected second subset of the local bus code architecture set of processor direct signal lines includes CPU address signal lines, CPU data signal lines and CPU control signal lines necessary for implementation of a first and a second of a plurality of specific bus code architectures including a first expansion bus code architecture and a second expansion bus code architecture, respectively;

selecting a first subset of the local bus code architecture set of processor direct signal lines necessary for implementation of the first expansion bus code architecture;

selecting a second subset of the local bus code architecture set of processor direct signal lines necessary for implementation of the second expansion bus code architecture; and connecting the first subset of the local bus code architecture set of processor direct signal lines necessary for implementation of the first expansion bus code architecture and the second subset of the local bus code architecture set of processor direct signal lines necessary for implementation of the second expansion bus code architecture to receptor means holding a riser card for communicating a first device which functions in accordance with the first expansion bus code architecture with the first subset of the local bus code architecture set of processor direct signal lines and for communicating a second device which functions in accordance with the second expansion bus code architecture with the second subset of the local bus code architecture set of processor direct signal lines.

17. A computer system, comprising:

a motherboard;

a local bus on the motherboard;

a CPU having ports for providing CPU local bus signals having a first protocol;

a memory section on the motherboard;

a processor support chip coupled to the CPU having ports for providing control, data and address signals of an I/O expansion bus having a second protocol;

an I/O expansion bus connector coupled to the control, data and address signals of the I/O expansion bus and connected to an I/O expansion device;

a local bus connector on the motherboard coupled to directly receive the CPU local bus signals;

a riser card;

a first riser card connector for coupling the riser card directly to the local bus connector;

alternate bus conversion means for converting the CPU local bus signals received through the riser connector to bus signals having a third protocol of an alternate expansion bus on the riser card; and an alternate expansion bus connector for receiving a next expansion device which next expansion device is coupled to the alternate expansion bus connector and receives the bus signals of the alternate expansion bus which bus signals of the alternate expansion bus include identification signals for identifying the alternate expansion device, and wherein the CPU determines the identity of the alternate expansion device through the CPU local bus.

18. A computer system, comprising:

a motherboard;

a local bus on the motherboard;

a CPU having ports for providing CPU local bus signals having a first protocol;

a memory section on the motherboard;

a processor support chip coupled to the CPU having ports for providing control, data and address signals of an I/O expansion bus having a second protocol;

an I/O expansion bus connector coupled to the control, data and address signals of the I/O expansion bus and connected to an I/O expansion device;

a local bus connector on the motherboard coupled to directly receive the CPU local bus signals;

a riser card;

a first riser card connector for coupling the riser card directly to the local bus connector;

alternate bus conversion means for converting the CPU local bus signals received through the riser connector to bus signals having a third protocol of an alternate expansion bus on the riser card; and an alternate expansion bus connector for receiving an expansion master device which expansion master device is coupled to the alternate expansion bus connector and is adapted to take control of the CPU local bus for a period of time, and wherein the bus signals of the alternate expansion bus are of the same protocol as the protocol of the expansion master device.

* * * * *